United States Patent
Nishimura

(10) Patent No.: US 9,061,703 B2
(45) Date of Patent: Jun. 23, 2015

(54) ELECTRIC POWER STEERING APPARATUS

(75) Inventor: Hiroshi Nishimura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/125,713

(22) PCT Filed: Oct. 24, 2011

(86) PCT No.: PCT/JP2011/074393
§ 371 (c)(1),
(2), (4) Date: Dec. 12, 2013

(87) PCT Pub. No.: WO2013/061391
PCT Pub. Date: May 2, 2013

(65) Prior Publication Data
US 2014/0107893 A1    Apr. 17, 2014

(51) Int. Cl.
*B62D 6/10*    (2006.01)
*B62D 5/04*    (2006.01)

(52) U.S. Cl.
CPC ............... *B62D 6/10* (2013.01); *B62D 5/0484* (2013.01); *B62D 5/0493* (2013.01)

(58) Field of Classification Search
CPC ............................. B62D 5/0484; B62D 5/0493
USPC ........................................ 701/41, 43; 180/466
See application file for complete search history.

(56) References Cited

U.S. PATENT DOCUMENTS

| 4,869,334 | A | 9/1989 | Marumoto et al. |
| 5,600,559 | A | 2/1997 | Nishimoto et al. |
| 6,032,756 | A | 3/2000 | Nishimura et al. |
| 2003/0169005 | A1 | 9/2003 | Ito et al. |
| 2006/0076182 | A1 | 4/2006 | Kifuku et al. |

(Continued)

FOREIGN PATENT DOCUMENTS

| JP | 63-255173 A | 10/1988 |
| JP | 7-137651 A | 5/1995 |

(Continued)

OTHER PUBLICATIONS

Communication from Japanese Patent Office issued Sep. 9, 2014, in counterpart Japanese Application No. JP 2013-540519.

(Continued)

*Primary Examiner* — John Q Nguyen
*Assistant Examiner* — Anshul Sood
(74) *Attorney, Agent, or Firm* — Sughrue Mion, PLLC; Richard C. Turner

(57) ABSTRACT

There is provided an electric power steering apparatus which includes a monitoring/controlling means that monitors a failure of a CPU, and controls a drive signal for driving a motor at the time of the failure of the CPU, wherein the monitoring/controlling means has a first control mode for suspending driving of the motor, and a second control mode for continuously controlling the motor with a provisional drive signal, in place of and for restricting the drive signal from the CPU; and wherein, when the monitoring/controlling means detects the failure of the CPU, the monitoring/controlling means selects the second control mode to thereby continue controlling the motor with the provisional drive signal in place of the drive signal from the CPU, and then selects, after the controlling in the second control mode, the first control mode to thereby suspend driving of the motor.

23 Claims, 13 Drawing Sheets

(56) References Cited

U.S. PATENT DOCUMENTS

| | | |
|---|---|---|
| 2008/0195275 A1 | 8/2008 | Kojo et al. |
| 2009/0143942 A1 | 6/2009 | Matsushita et al. |
| 2009/0294208 A1* | 12/2009 | Nishimura et al. ........... 180/446 |

FOREIGN PATENT DOCUMENTS

| | | |
|---|---|---|
| JP | 3285490 B2 | 5/2002 |
| JP | 2003-26024 A | 1/2003 |
| JP | 2003-335251 A | 11/2003 |
| JP | 2005-271860 A | 10/2005 |
| JP | 2005-319931 A | 11/2005 |
| JP | 2006-76478 A | 3/2006 |
| JP | 2006-111211 A | 4/2006 |
| JP | 2006-143106 A | 6/2006 |
| JP | 2009-132281 A | 6/2009 |
| JP | 2009-173180 A | 8/2009 |
| JP | 2010-23657 A | 2/2010 |
| JP | 2010-184689 A | 8/2010 |
| JP | 2010-235116 A | 10/2010 |

OTHER PUBLICATIONS

Communication dated Mar. 20, 2015 issued by the Korean Intellectual Property Office in counterpart Korean Patent Application No. 10-2013-7034316.

* cited by examiner

ELECTRIC POWER STEERING APPARATUS

CROSS REFERENCE TO RELATED APPLICATIONS

This application is a National Stage of International Application No. PCT/JP2011/074393 filed Oct. 24, 2011, the contents of all of which are incorporated herein by reference in their entirety.

TECHNICAL FIELD

This invention relates to an electric power steering apparatus that drive-controls a motor, based on a steering torque of a driver, to reduce the steering torque of the driver by motive power produced by the motor.

BACKGROUND ART

Electric power steering apparatuses are provided for driving a motor according to information of a steering torque signal, a vehicle speed, etc., so as to achieve a function of reducing a steering force of a driver. If a failure (abnormality) occurs in a main-CPU (Central Processing Unit) for controlling the motor, it is necessary to restrict the output of the motor in order to ensure the safety. Meanwhile, as a method for restricting the motor output irrespective of the presence or absence of a failure of the main-CPU, there is a method using so-called interlock means, in which a region for prohibiting the output is determined with respect to a relationship between the (steering) torque signal and a motor-drive current signal, so that the motor output is prohibited when it falls in this output prohibited region. Instead, there is a method in which a sub-CPU for monitoring the motor-controlling main-CPU is provided, so that the energization of the motor is suspended when the sub-CPU detects a failure of the main-CPU.

Further, since suspending the driving of the motor makes it difficult to rotate the steering wheel, resulting in a possibility that it becomes unable to cause the running itself of the vehicle, there is also a case where the controlling is continued as long as possible depending on the content of the failure. This is exemplified by the case where the controlling is continued using a sub-torque signal when a main-torque signal is abnormal.

CITATION LIST

Patent Document

Patent Document 1: Japanese Patent No. 3285490
Patent Document 2: Japanese patent Application Laid-open No. 2003-26024
patent Document 3: Japanese patent Application Laid-open No. 2005-271860

SUMMARY OF THE INVENTION

Problems to be Solved by the Invention

In the system disclosed in Patent Document 1, a method using so-called interlock means is applied in which a region for prohibiting the output is determined with respect to a relationship between the torque signal and the motor-drive current signal, so that the motor output is prohibited when it falls in this output prohibited region. Although the interlock means restricts the motor output, it does not determine a failure of a CPU, so that the CPU, even in an abnormal state, continues to cause driving of the motor until the driver turns off the ignition key.

In the system disclosed in Patent Document 2, a sub-CPU for monitoring the main-CPU is provided, so that the motor driving is suspended when the main-CPU is abnormal. Thus, at the time of occurrence of the failure in the main-CPU, it is unable to continue the controlling thereby losing the power steering function, so that the driver has to steer by his/her own power. Meanwhile, according to Patent Document 3, an alternative controlling is continued as long as possible depending on the content of a failure; however, in the case of CPU failure, the alternative controlling can not be taken, so that, similarly to Patent Document 2, it is required to steer by the driver's own power.

This invention has been made to solve these problems, and an object thereof is to provide an electric power steering apparatus capable of detecting a CPU failure if occurred, then restricting the drive output of the motor while keeping a least power steering function, and suspending the motor driving after the restriction of the drive output.

Means for Solving the Problems

An electric power steering apparatus of the invention comprises: a steering torque sensor that detects a steering torque applied to a steering wheel by a driver; a motor that provides motive power to a steering system to assist a steering force of the driver; and a CPU that outputs a drive signal for driving the motor, according to the steering torque detected by the steering torque sensor; said electric power steering apparatus including: a monitoring/controlling means that monitors a failure of the CPU and controls the drive signal for driving the motor at the time of the failure of the CPU; wherein the monitoring/controlling means has a first control mode for suspending driving of the motor, and a second control mode for continuously controlling the motor with a provisional drive signal, in place of and for restricting the drive signal from the CPU; and wherein, when the monitoring/controlling means detects the failure of the CPU, the monitoring/controlling means selects the second control mode to thereby continue controlling the motor with the provisional drive signal in place of the drive signal from the CPU, and then selects, after the controlling in the second control mode, the first control mode to thereby suspend driving of the motor.

Effect of the Invention

According to the electric power steering apparatus according to the invention, it is possible to detect a CPU failure if occurred, then to restrict the drive output of the motor while keeping a least power steering function, and to suspend the motor driving after the restriction of the drive output. Accordingly, if a CPU failure occurred, it is possible to suspend the motor driving after having kept the least power steering function. The objects, features, aspects and advantages of the present invention, other than the foregoing, will become more apparent from the following detailed description with reference to the drawings.

MODES FOR CARRYING OUT THE INVENTION

Embodiment 1

Figure 1:
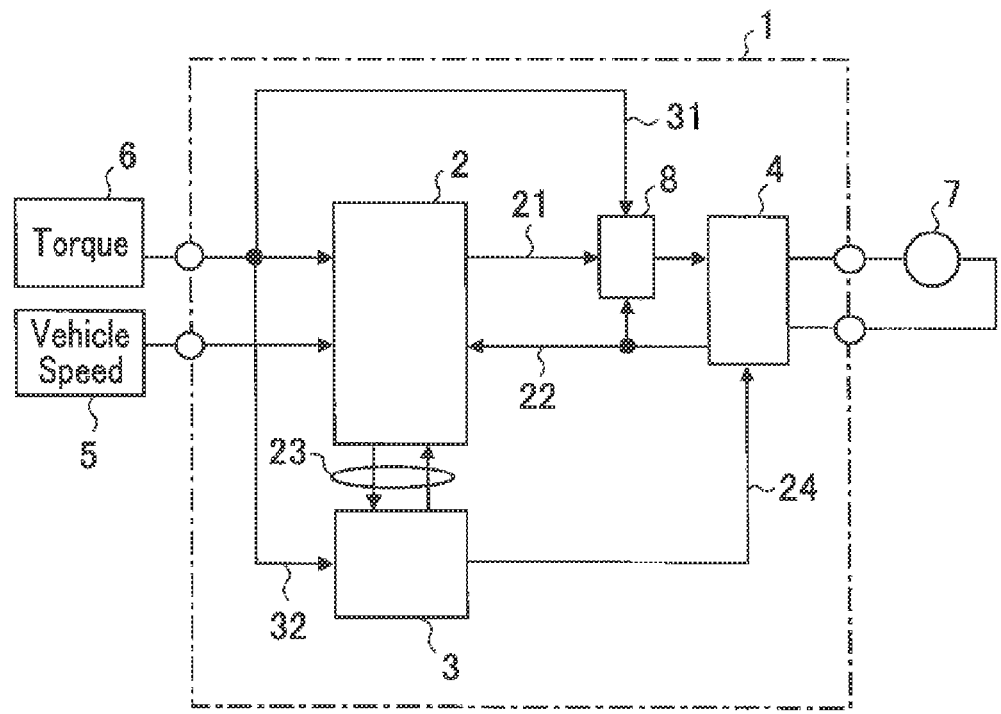
FIG. 1 is a block diagram showing an electric power steering apparatus according to Embodiment 1 of the invention.

FIG. 1 is a block diagram showing an electric power steering apparatus according to the invention. To a control unit 1 of the electric power steering apparatus, there are connected a vehicle speed sensor 5, a steering torque sensor 6 and a motor 7, which are installed in a vehicle. The vehicle speed sensor 5 detects a vehicle speed to output a vehicle speed signal. The steering torque sensor 6 detects a steering torque applied to a steering wheel by a driver to output a steering torque signal. The motor 7 provides motive power to a steering (steering gear) system of the vehicle to thereby assist a steering force of the driver. The control unit 1 is configured mainly with a main-CPU (main microcomputer) 2, a sub-CPU (sub microcomputer) 3, a drive circuit 4 of the motor 7, and an interlock means 8. The vehicle speed signal from the vehicle speed sensor 5 and the steering torque signal from the steering torque sensor 6 are input into the main-CPU 2, which calculates according to these information, a target drive current for driving the motor 7 and outputs a drive-current signal (drive signal) as well as controls an actual drive current to match the target drive current.

Figure 2:
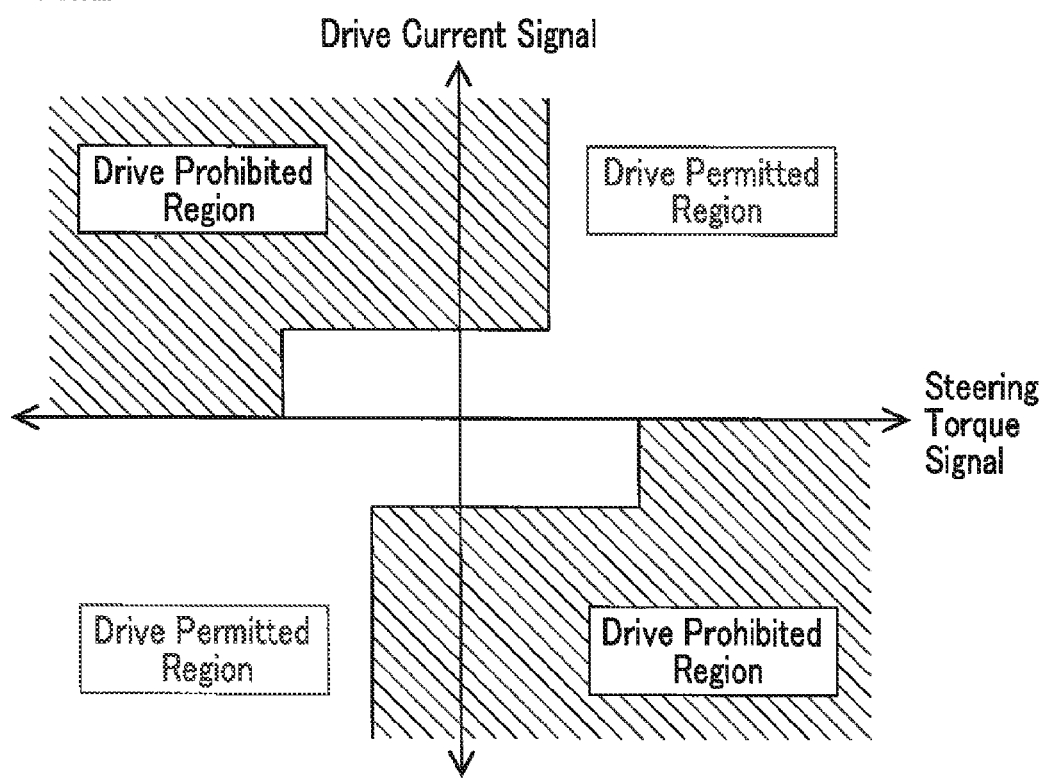
FIG. 2 is a chart for showing an interlock function according to Embodiment 1.

The drive-current signal for driving the motor is output to a line 21 and then transmitted to the interlock means 8. As shown for example in FIG. 2, the interlock means 8 has a drive permitted region and a drive prohibited region with respect to a relationship between the steering torque signal and the drive-current signal. When the (steering) torque signal input through a line 31 and the drive-current signal from the main-CPU, fall within the drive permitted region, the interlock means transmits to the drive circuit 4 the drive-current signal as it is; and when they fall within the drive prohibited region, the interlock means adds a restriction on the drive-current signal (for example, to suppress or suspend driving of the motor) so that it goes out of the drive prohibited region. Namely, the interlock means 8 has a characteristic that restricts the drive-current signal of the motor 7 so as to suppress driving of the motor 7, when the drive-current signal for the motor 7 acts to drive the motor 7 in a direction opposite to a direction of the steering-torque signal applied to the steering wheel.

The interlock means 8 has the drive permitted region and the drive prohibited region, which are in common at the normal time and at the abnormal time (of the main-CPU), to thereby restrict the drive-current signal. At the abnormal time, the drive-current signal becomes highly likely to fall within the drive prohibited region, and thus, the interlock means adds a restriction on the drive-current signal so that it goes out of the drive prohibited region. Therefore, when the main-CPU becomes abnormal, the drive-current signal output from the interlock means 8 becomes a provisional drive-current signal whose output for driving the motor 7 is restricted out of the drive prohibited region. In this case, the provisional drive signal serves to restrict the drive signal for the motor 7 so as to suppress driving of the motor 7, when the drive signal for the motor 7 acts to drive the motor 7 in a direction opposite to the direction of the steering torque signal applied to the steering wheel.

The drive circuit 4 activates switching elements of an H-bridge circuit according to the input drive-current signal, thereby causing the motor 7 to rotate in a normal or reverse direction. Further, the drive circuit 4 measures a current flowing through the motor, and transmits the measured one as an actual drive current, to the main-CPU 2 and the interlock means 8 through the line 22. Meanwhile, the main-CPU 2 and the sub-CPU 3 continuously communicates with each other through lines 23, so that both of these CPUs mutually monitor whether each of their operations is normal or not. The sub-CPU 3 is a monitoring/controlling means, which monitors failure of the main-CPU 2, and controls the drive-current signal for driving the motor 7 at the time of the failure of the main-CPU 2. The sub-CPU 3 has a first control mode for controlling driving of the motor 7 to be suspended, and a second control mode for continuously controlling the motor 7 with the provisional drive-current signal in place of the drive-current signal from the main CPU.

Upon detection of the failure of the main-CPU 2, the sub-CPU 3 selects the second control mode to thereby control through a line 24 the drive circuit 4 to accept transmission of the provisional drive-current signal output from the interlock means 8, in place of the drive-current signal from the main-CPU, so as to continuously control the motor 7. Thereafter, when a predetermined condition is established, for example, when the torque signal becomes neutral so that the driving of the motor is suspended, namely, at the time the sub-CPU receives through a line 32, information that the torque signal from the steering torque sensor 6 has become zero, the sub-CPU 3 selects the first control mode to thereby suspend the drive circuit 4 through the line 24 so as to suspend driving of the motor 7. The above case of when a predetermined condition is established, may be a case of when a predetermined time has lapsed or the vehicle speed becomes a predetermined value or lower, after the sub-CPU 3 detected the failure of the main-CPU 2.

An operation of the sub-CPU 3 will be described by way of a flowchart in FIG. 3. In this flowchart, as parameters, Error Flag "EF", Control Mode "CM" and Drive Control "DC" are used. Error Flag "EF" means whether or not the sub-CPU 3 detects the failure of the main-CPU 2, where the case of "0" represents a non-detection state and "1" represents a detection state. Control Mode "CM" means a control mode of the sub-CPU 3, where the case of "0" represents a non-detection state of the failure of the main-CPU 2, "1" represents the first control mode for suspending the drive circuit 4, and "2" represents the second control mode upon detection of the failure of the main-CPU 2. Drive Control "DC" means a state of the control signal for the drive circuit 4 output by the sub-CPU 3.

Figure 3:
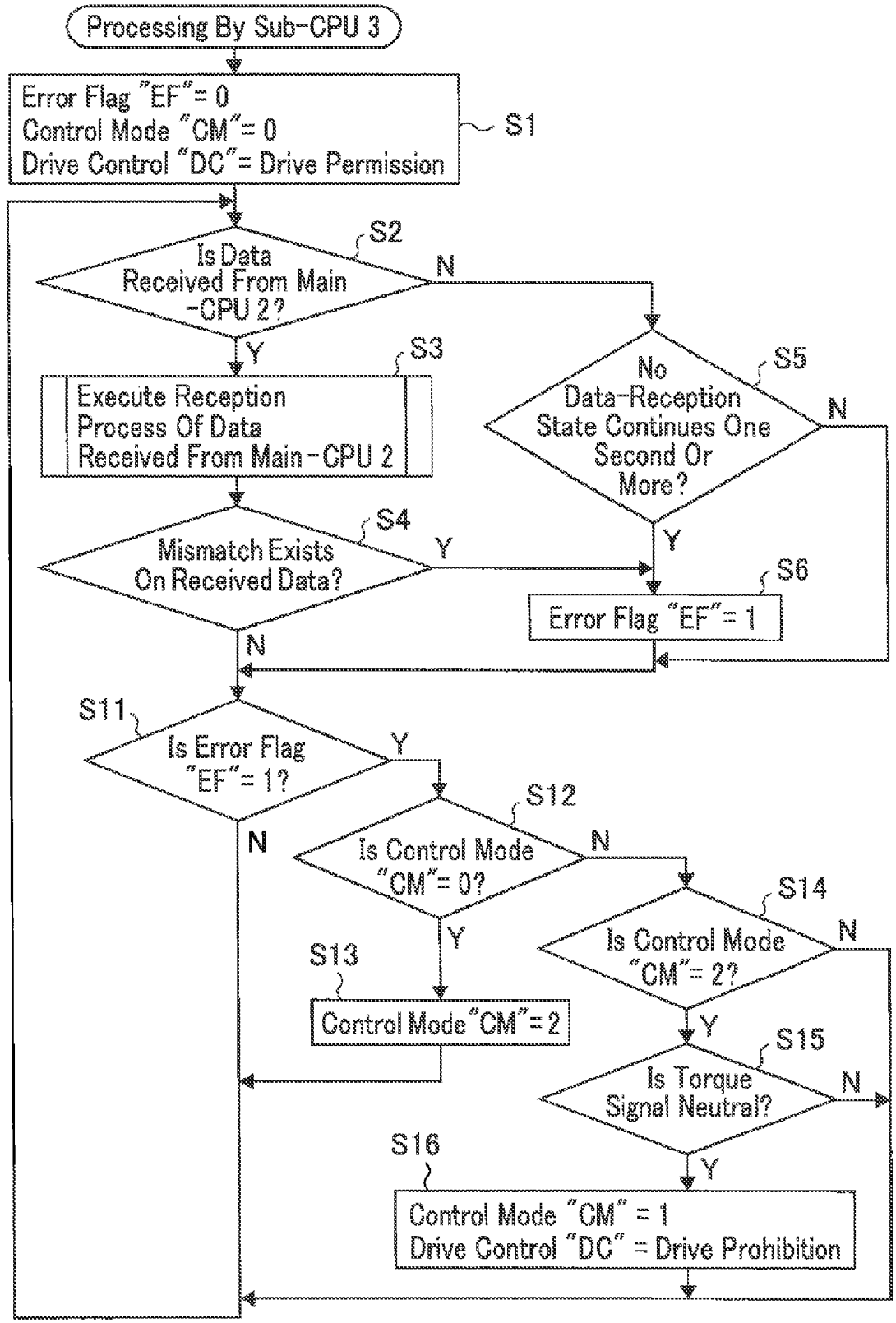
FIG. 3 is a flowchart for illustrating an operation of a sub-CPU according to Embodiment 1.

In FIG. 3, Step S1 is an initializing process of the parameters, which is executed just once at the startup time. In this Step, Error Flag "EF" is set to "0", Control Mode "CM" is set to "0" and Drive Control "DC" is set to "Drive Permission". After execution of Step S1, the flow transits to Step S2. In Step S2, the presence or absence of incoming data from the main-CPU 2 is checked; then, the flow branches to Step S3 in the case of the presence of the incoming data, and branches to Step S5 in the case of the absence of the incoming data. In Step S3, reception processing is taken in which the data received from the main-CPU 2 is stored in a RAM built in the sub-CPU 3. After execution of Step S3, the flow transits to Step S4.

In Step S4, the data having been stored in the RAM in Step S3 is compared to prescribed data that was previously retained in a ROM built in the sub-CPU 3; then, the flow branches to Step S11, if these data are matched to each other, with the determination of "no mismatch on the received data", and branches to Step S6, if these data are not matched to each other, with the determination of "mismatch exists on the received data". Note that the content of the prescribed data retained in the ROM built in the sub-CPU 3, is made identical to that of the data to be received by the sub-CPU 3 at the time the main-CPU 2 operates normally. In Step S5, the time elapsed after the previous reception from the main-CPU 2 has been taken place, is measured; then, the flow branches to Step S6 if the elapsed time reaches one second or more without interruption, and branches to Step S11 if the elapsed time is less than one second.

In Step S6, it is determined that there is a failure, according to a result of communication with the main-CPU 2, so that Error Flag "EF" is set to "1". After execution of Step S6, the flow transits to Step S11. In Step S11, the failure of the main-CPU 2 is determined with reference to Error Flag "EF", and when Error Flag "EF" is "0", it is determined as normal, so that the flow branches to Step S2. When Error Flag "EF" is "1", it is determined as abnormal, so that the flow branches to Step S12. In Step S12, the control mode of the sub-CPU 3 is determined with reference to Control Mode "CM", and when Control Mode "CM" is "0", the flow branches to Step S13, recognizing that the failure is now determined, and when Control Mode "CM" is other than "0", the flow branches to Step S14.

In Step S13, Control Mode "CM" is set to "2", to thereby place the sub-CPU 3 in the second control mode. After execution of Step S13, the flow transits to Step S2. In Step S14, Control Mode "CM" is referred, so that the flow branches to Step S15 when Control Mode "CM" is "2", and branches to Step S2 when Control Mode "CM" is "1". In Step S15, the torque signal is monitored, so that the flow branches to Step S16 when the torque signal is neutral, and branches to Step S2 when the torque signal is other than neutral. Note that regarding the neutral torque signal, when a torque signal falls in a range of ±1 Nm, it is determined to be neutral. In Step S16, Control Mode "CM" is set to "1" to thereby place the sub-CPU 3 in the first control mode, and Drive Control "DC" is set to "Drive Prohibition" to thereby suspend the drive circuit 4. After execution of Step S16, the flow transits to Step S2.

In the conventional apparatus using a sub-CPU, the driving of the motor is immediately suspended at the time the failure of the main-CPU 2 is detected. In contrast, according to the invention, the sub-CPU 3 selects the second control mode at that time, thereby making it possible to continue driving of the motor 7 within a safe range by the provisional drive-current signal controlled by the interlock means 8, and after continuing driving of the motor 7, the sub-CPU suspends driving of the motor 7. Meanwhile, in the conventional apparatus using an interlock means, although the interlock means restricts the motor output, it does not determine a failure of a CPU, and thus the CPU, even in a failure state, continues to cause driving of the motor until the driver turns off the ignition key. In contrast, according to the invention, after selection of the second control mode, the sub-CPU 3 can select the first mode when a predetermined condition is established, to thereby suspend the function of the electric power steering apparatus.

Embodiment 2

Figure 4:
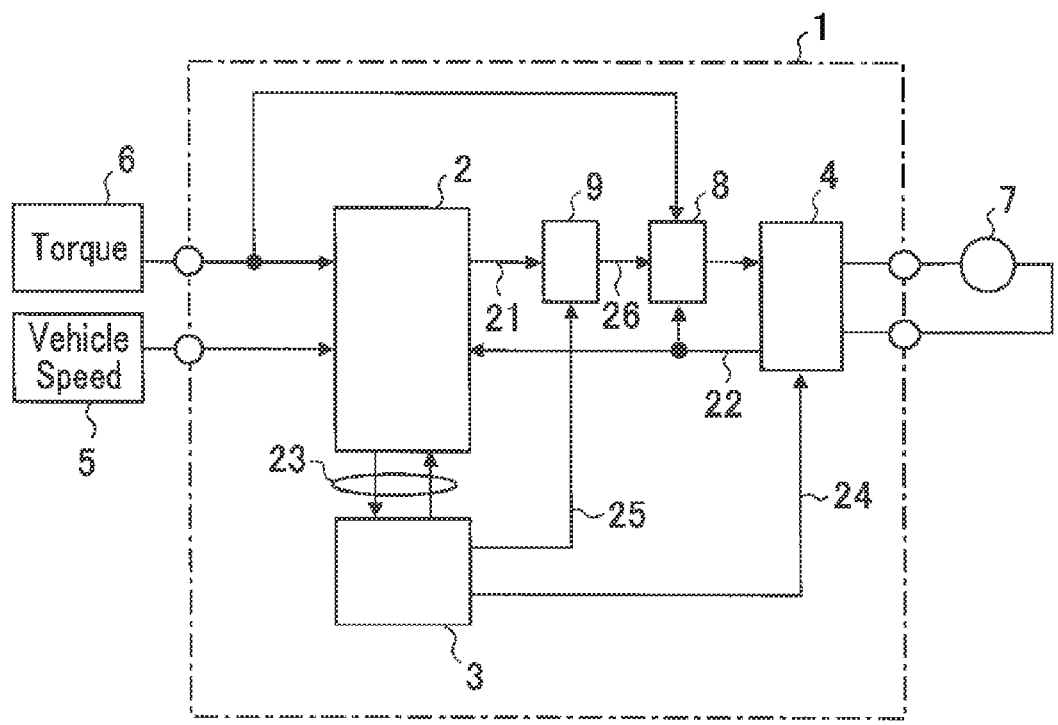
FIG. 4 is a block diagram showing an electric power steering apparatus according to Embodiment 2.

In Embodiment 1, upon detection of the failure of the main-CPU 2, the sub-CPU 3 accepts transmission of the drive signal output from the interlock means 8 as the provisional drive signal, to thereby restrict the output of the motor 7; however, the function of the electric power steering apparatus may be suspended after gradually adding restrictions on the drive signal for the motor 7. FIG. 4 is a block diagram of an electric power steering apparatus according to Embodiment 2. In the figure, since the same numerals represent the same or equivalent parts, their descriptions are omitted. Hereinafter, this is similarly applied to the respective figures.

Figure 5:
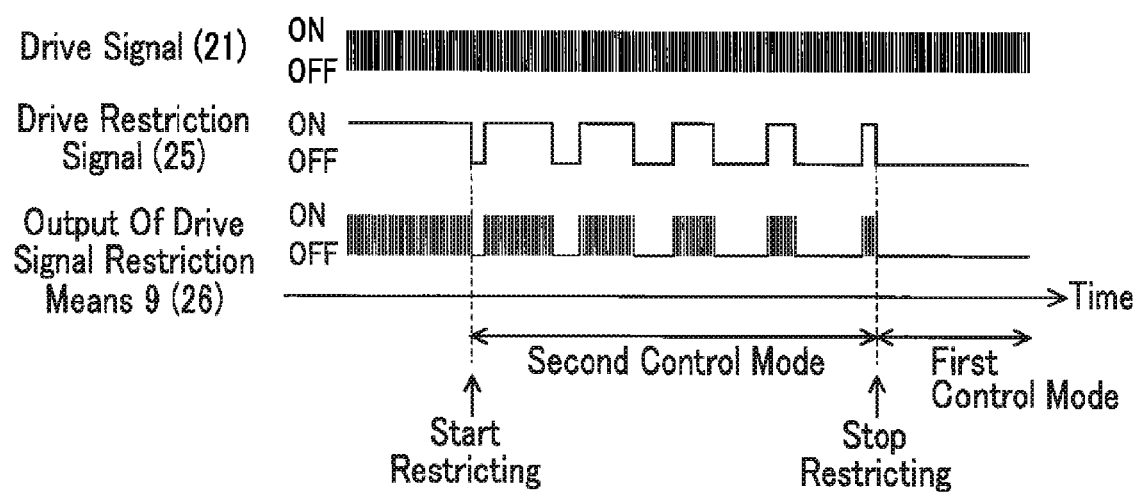
FIG. 5 is a timing chart of a provisional drive signal according to Embodiment 2.

A drive signal restriction means 9 serves to output a provisional drive signal which is resulted from restricting the drive signal for the motor 7 output by the main-CPU 2, according to a signal of the sub-CPU 3 when detected the failure of the main-CPU 2. The drive signal restriction means 9 does not add any restriction when the sub-CPU 3 has not yet detected the failure of the main-CPU 2; however, when the failure is detected and the second control mode is selected, the drive signal restriction means adds restrictions with a lapse of time. Specifically, as shown in FIG. 5, the drive signal restriction means 9 calculates a logical product (by AND circuit) of the drive signal by the main-CPU 2 input through the line 21 and a drive restriction signal input through a line 25 (a signal at the time the sub-CPU 3 selects the second control mode), and output it to a line 26. Thus, as the sub-CPU 3 gradually increases the rate of OFF-state per unit time of the drive restriction signal, the function of the electric power steering goes to be suspended slowly with a lapse of time. After the output of the drive signal restriction means 9 is completely suspended (for example, 10 minutes later from when the sub-CPU 3 detects the failure), the sub-CPU 3 selects the first control mode to thereby suspend the drive circuit 4 through the line 24, so that it becomes possible to suspend the function of the electric power steering apparatus without giving a rapid change in steering force to the driver.

Embodiment 3

Figure 6:
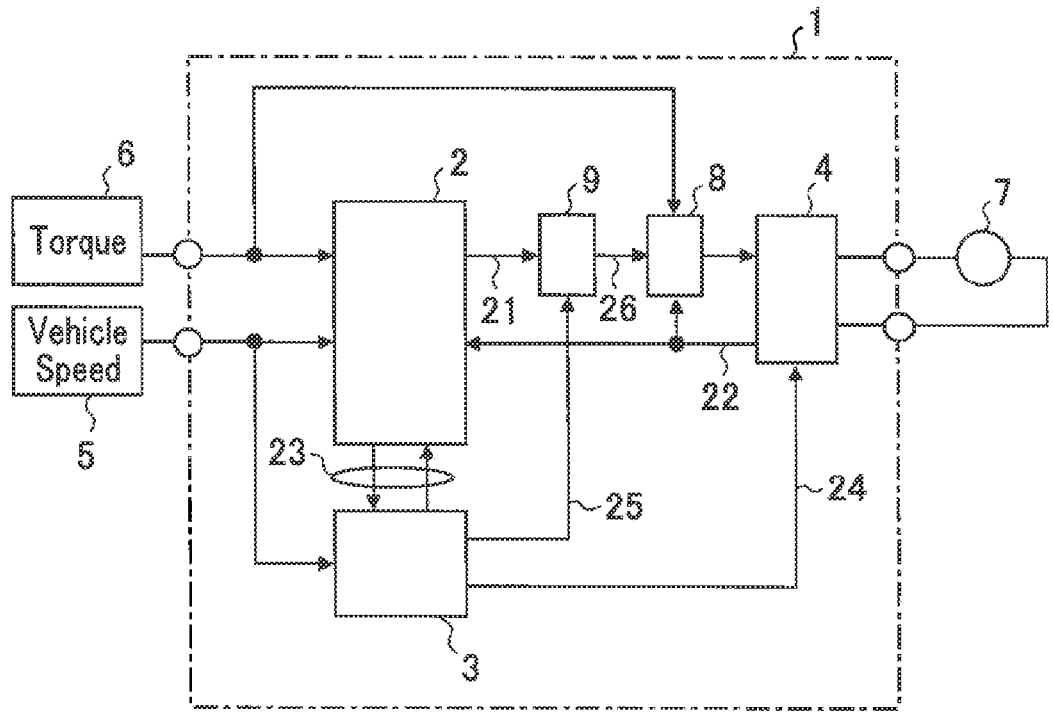
FIG. 6 is a block diagram showing an electric power steering apparatus according to Embodiment 3.
Figure 7:
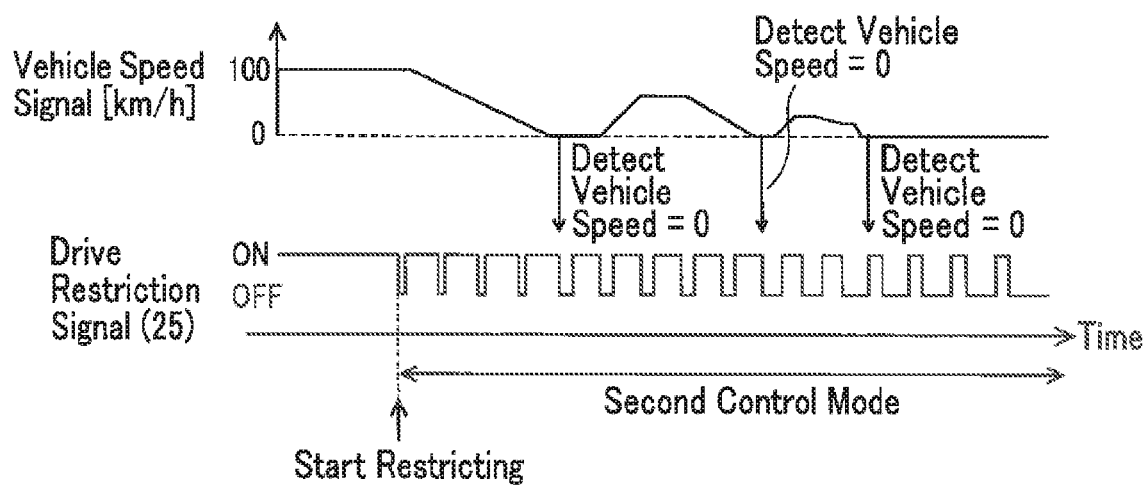
FIG. 7 is a timing chart for illustrating how a provisional drive signal is derived, according to Embodiment 3.

In Embodiment 2, the restriction for the provisional drive signal is enhanced depending on the elapsed time; however, the restriction may be changed depending on the vehicle speed signal by inputting this signal in the sub-CPU 3. FIG. 6 is a block diagram showing an electric power steering apparatus according to Embodiment 3. To the vehicle speed sensor 5 is connected the sub-CPU 3 into which the vehicle speed signal is input. As shown in FIG. 7, gradually, and at every time the sub-CPU 3 detects the input vehicle speed signal to be "0", the sub-CPU increases the rate of OFF-state per unit time of the drive restriction signal, so that the function of the electric power steering goes to be suspended slowly.

Namely, the drive signal restriction means 9 calculates a logical product of the drive signal input through the line 21 (a signal on the top of FIG. 5) and the drive restriction signal input through the line 25 (a signal in the middle of FIG. 7) and output it to the line 26; thus, as the sub-CPU 3 increases the rate of OFF-state per unit time of the drive restriction signal, gradually, and at every time it detects the input vehicle speed signal to be "0" (or, at every time the vehicle speed signal makes a change), the function of the electric power steering goes to be suspended slowly. After the output (provisional drive signal) of the drive signal restriction means 9 is suspended (or after it can be deemed suspended, for example, after the number of detections of the vehicle speed "0" becomes four), the sub-CPU 3 selects the first control mode to thereby suspend the drive circuit 4 through the line 24, so that it becomes possible to suspend the function of the electric power steering apparatus without giving a rapid change in steering force to the driver. Instead, the function of the electric power steering apparatus may be suspended when the output of the drive signal restriction means 9 becomes lower than a predetermined magnitude.

Embodiment 4

Figure 8:
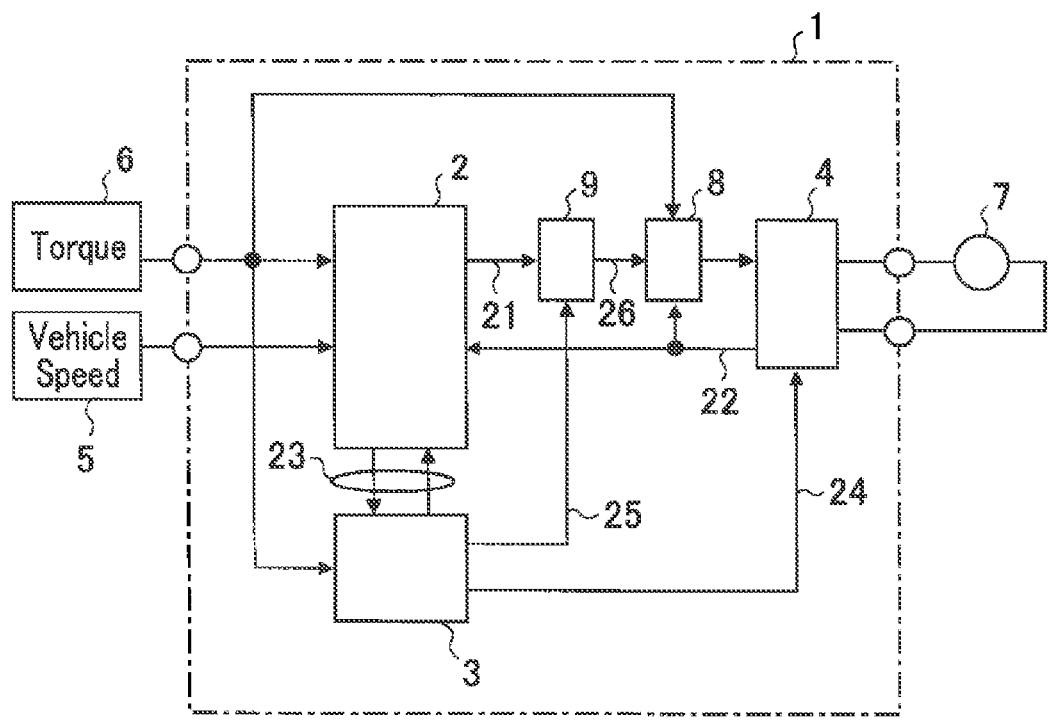
FIG. 8 is a block diagram showing an electric power steering apparatus according to Embodiment 4.
Figure 9:
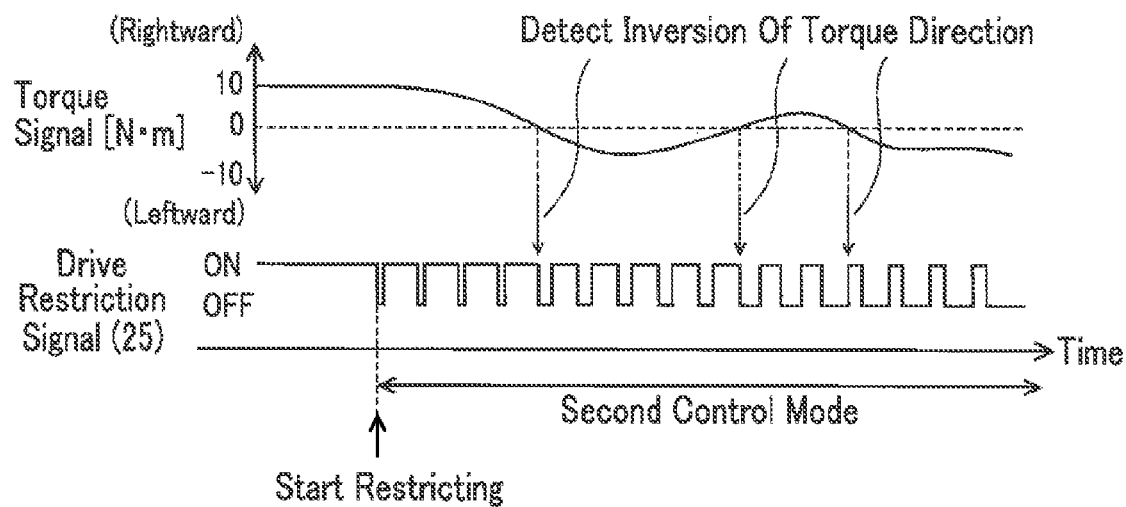
FIG. 9 is a timing chart for illustrating how a provisional drive signal is derived according to Embodiment 4.

In Embodiment 2, the restriction for the provisional drive signal is enhanced depending on the elapsed time; however, the restriction may be changed depending on the torque signal by inputting this signal in the sub-CPU 3. FIG. 8 is a block diagram showing an electric power steering apparatus according to Embodiment 4. To the torque sensor 6 is connected the sub-CPU 3 into which the torque signal is input. As shown in FIG. 9, gradually, and at every time the sub-CPU 3 detects inversion of the direction of the torque signal, the sub-CPU increases the rate of OFF-state per unit time of the drive restriction signal, so that it is achieved that the function of the electric power steering goes to be suspended slowly.

Namely, the drive signal restriction means 9 calculates a logical product of the drive signal input through the line 21 (a signal on the top of FIG. 5) and the drive restriction signal input through the line 25 (a signal in the middle of FIG. 9) and output it to the line 26; thus, as the sub-CPU 3 increases the rate of OFF-state per unit time of the drive restriction signal, gradually, and at every time it detects inversion of the torque signal direction (or, at every time the torque signal makes a change), the function of the electric power steering goes to be suspended slowly. After the output (provisional drive signal) of the drive signal restriction means 9 is suspended (or after it can be deemed suspended, for example, after the number of inversions of the torque signal direction becomes twenty), the sub-CPU 3 selects the first control mode to thereby suspend the drive circuit 4 through the line 24, so that it becomes possible to suspend the function of the electric power steering apparatus without giving a rapid change in steering force to the driver.

Embodiment 5

Figure 10:
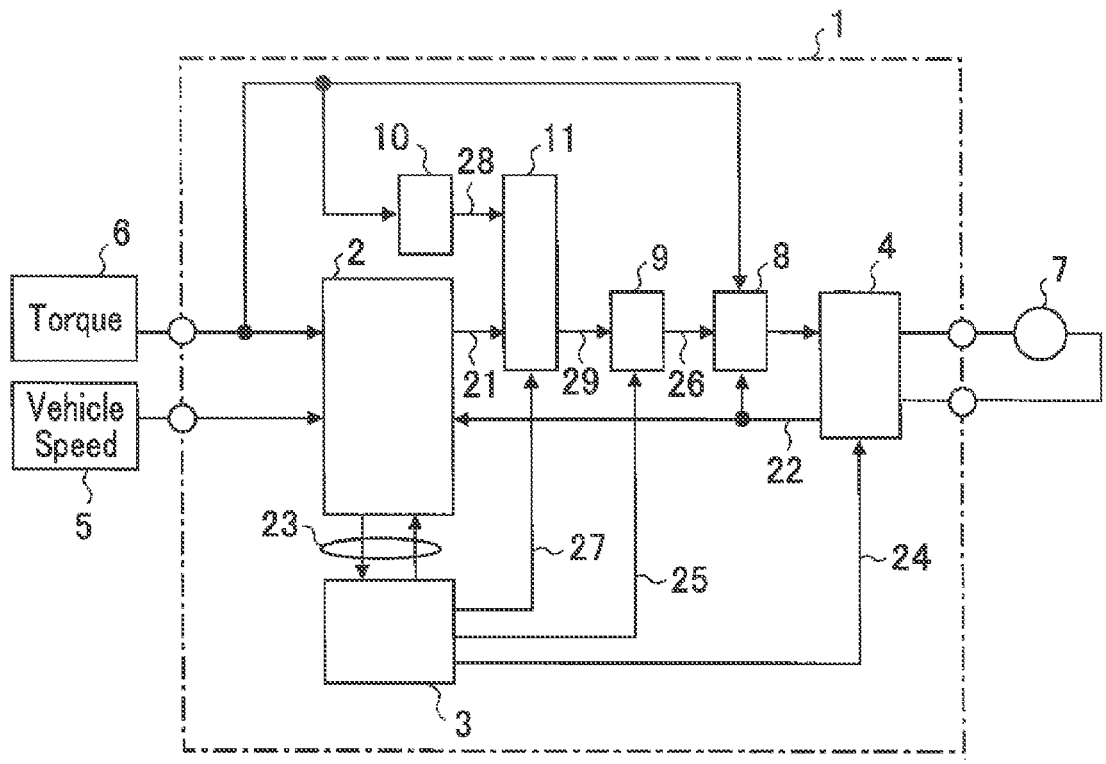
FIG. 10 is a block diagram showing an electric power steering apparatus according to Embodiment 5.
Figure 11:
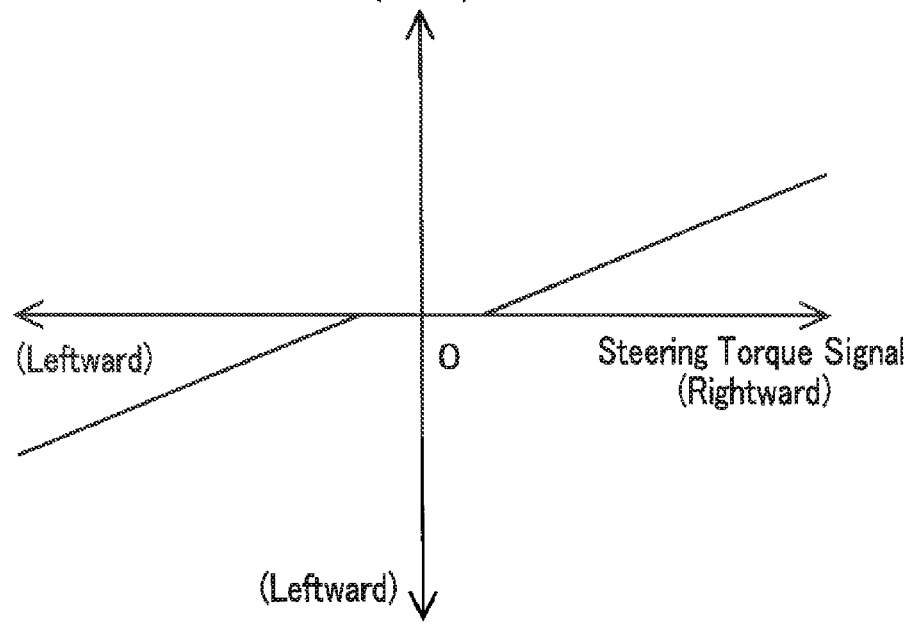
FIG. 11 is an output characteristic diagram of a second drive-signal generating means according to Embodiment 5.

In Embodiment 1 through Embodiment 4, even after the sub-CPU 3 selects the second control mode, such a provisional drive signal is used that is based on the drive signal output from the main-CPU 2 through the line 21; however, the motor 7 may instead be driven based on a drive signal that is generated by another means independent of the main-CPU 2. FIG. 10 is a block diagram showing an electric power steering apparatus according to Embodiment 5. A second drive-signal generating means 10 calculates a direction and magnitude of driving the motor 7 as shown in FIG. 11 according to the (steering) torque signal, and output it as the drive signal for the motor 7. This means generates, in the case of rightward steering, a signal for driving the motor 7 rightward according to the steering torque, and generates, in the case of leftward steering, a signal for driving the motor 7 leftward according to the steering torque. The magnitude of the signal to be output, is set by a DUTY value of a PWM (Pulse Width Modulation) signal.

Figure 12:
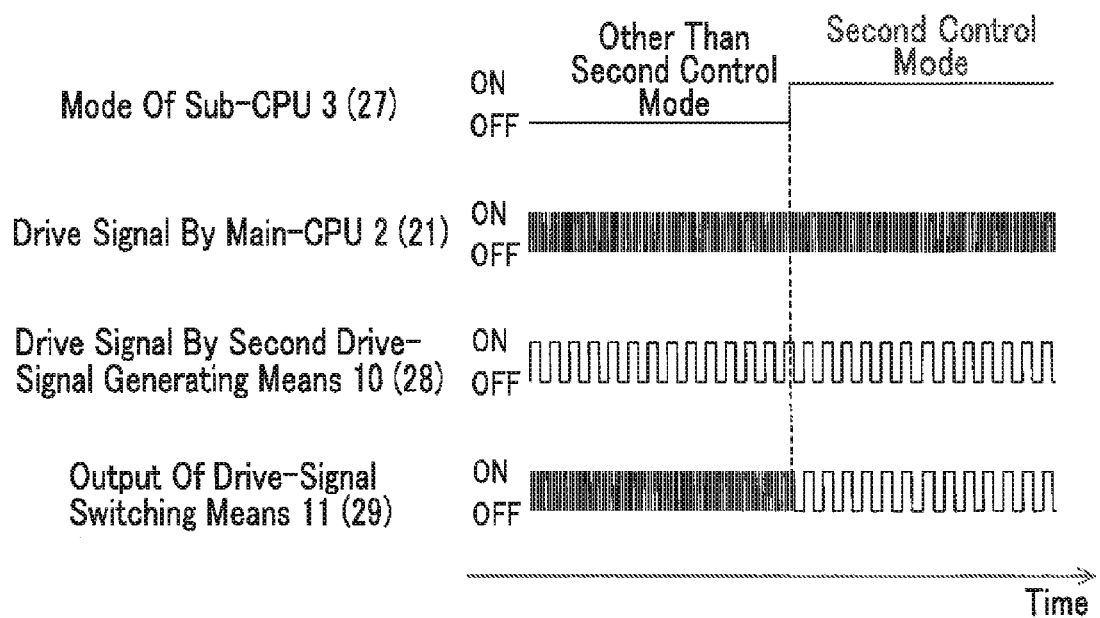
FIG. 12 is a diagram showing an operation of a drive-signal switching means according to Embodiment 5.

Upon detection of the failure of the main-CPU 2, the sub-CPU 3 selects the second control mode as described in Embodiment 1. To a drive-signal switching means 11, a switching signal is input that reflects a determination result as to whether the sub-CPU 3 selects the second control mode or not, through a line 27. As shown in FIG. 12, the drive-signal switching means 11 selects and output to a line 29, the drive signal output from the main-CPU 2 and input thereto through the line 21, when the switching signal is other than for the second control mode; or the drive signal output from the second drive-signal generating means 10 and input thereto through a line 28, when the switching signal is for the second control mode. By using the drive-signal switching means 11, a provisional drive signal becomes not dependent solely on the main-CPU 2, making it possible to generate a more stable assist-torque when the sub-CPU 3 selects the second control mode.

Figure 13:
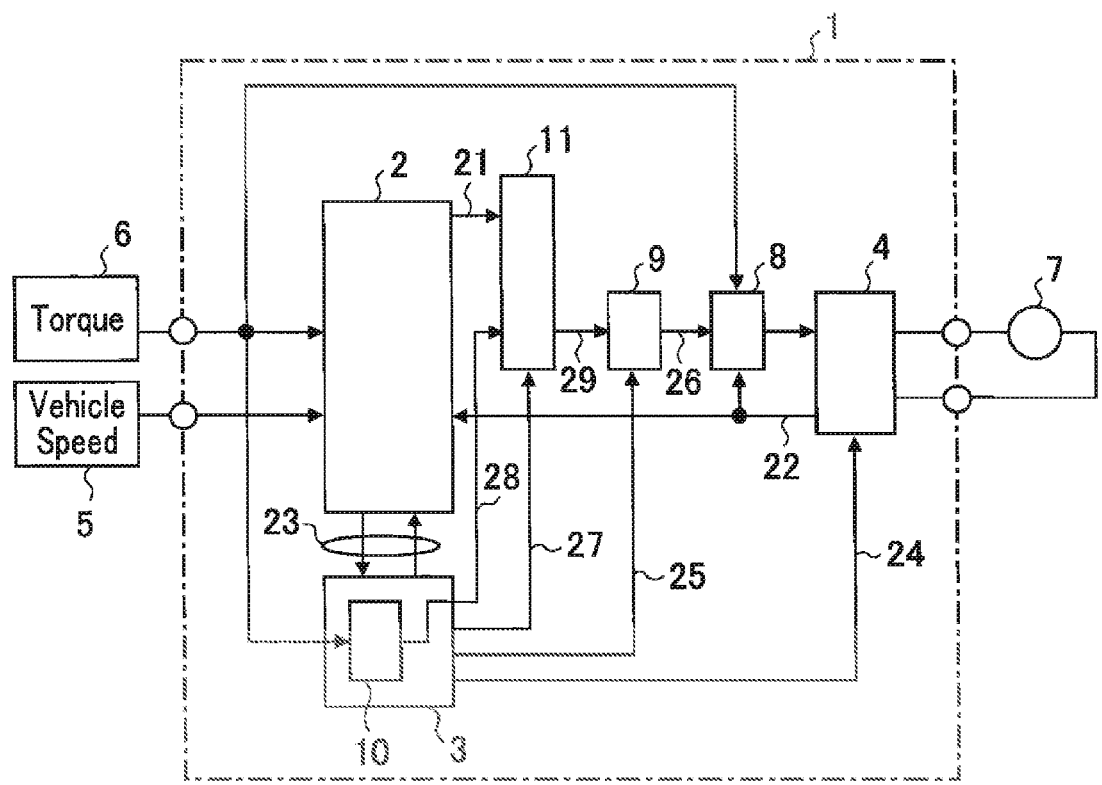
FIG. 13 is a block diagram showing another electric power steering apparatus according to Embodiment 5, in which a second drive-signal generating means is incorporated in a sub-CPU.

In is noted that, in the block diagram of FIG. 10, the second drive signal generating means 10 is illustrated as a configuration independently of the sub-CPU 3; however, it may be incorporated in the sub-CPU 3 as shown in FIG. 13.

Embodiment 6

Figure 14:
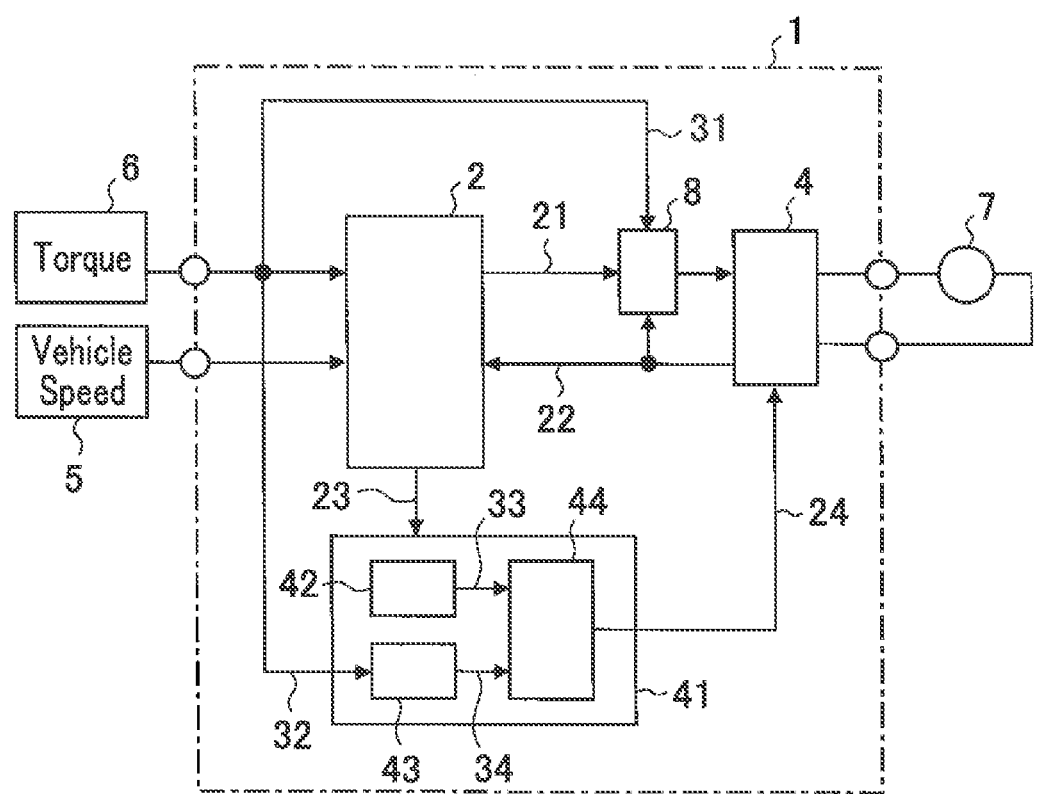
FIG. 14 is a block diagram showing an electric power steering apparatus according to Embodiment 6 of the invention, in which another monitoring/controlling circuit is shown.

In Embodiments 1 to 5, the sub-CPU 3 is used as a monitoring/controlling means that monitors the main CPU 2 and controls the drive signal for driving the motor 7 at the time of the failure of the main-CPU 2; however, such a means can be realized without using a CPU. FIG. 14 corresponds to Embodiment 1 except that the sub-CPU 3 is replaced with a monitoring/controlling circuit 41. The monitoring/controlling circuit 41 includes a communication monitoring circuit 42, a torque signal monitoring circuit 43 and a drive-circuit controlling circuit 44. Note that, what is herein executed through the communication with the main-CPU 2, is only a receiving operation.

Figure 15:
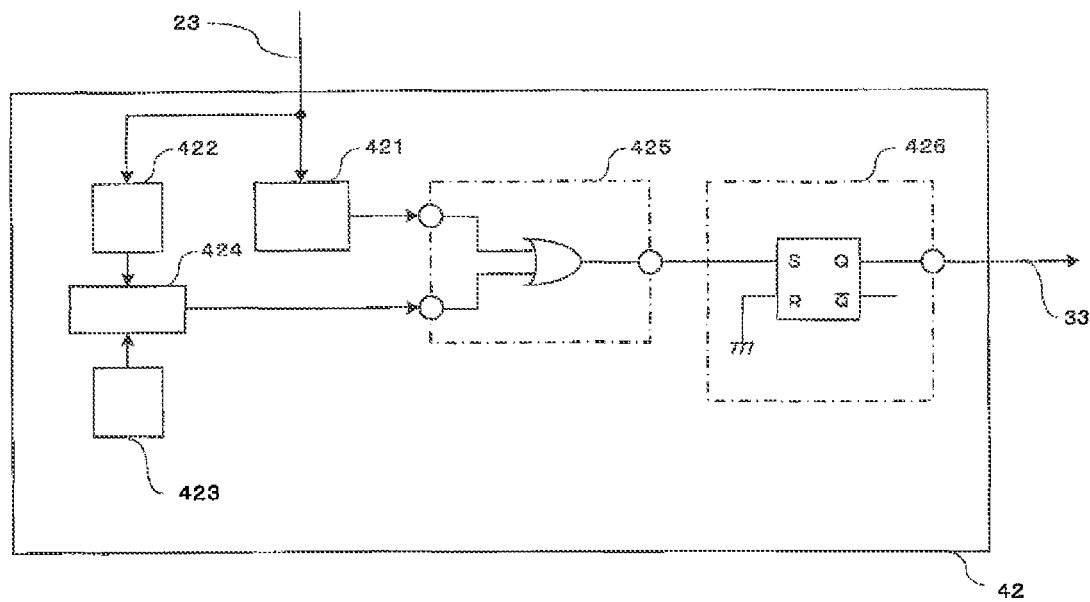
FIG. 15 is a block diagram showing the communication monitoring circuit according to Embodiment 6.
Figure 16:
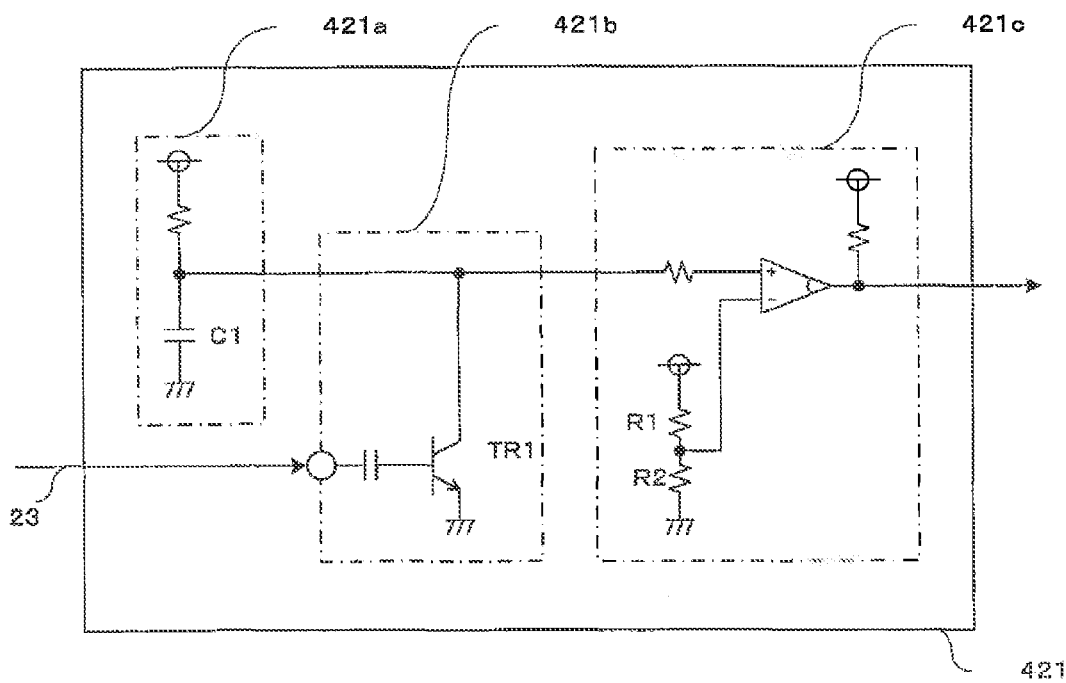
FIG. 16 is a block diagram showing a timer circuit according to Embodiment 6.

As shown in FIG. 15, the communication monitoring circuit 42 is configured with a timer circuit 421, a RAM 422, a ROM 423, a comparator 424, an error determination circuit 425, and an output retaining circuit 426. The signal received from the main-CPU 2 is input through the line 23 into the timer circuit 421 and the RAM 422. As shown in FIG. 16, the timer circuit 421 is configured with a general CR circuit 421a; a reset circuit 421b which discharges the stored charges in a capacitor C1 at the time the signal received from the main-CPU 2 and being input through the line 23 changes from "L" to "H"; and a determination circuit 421c which sets its output to "H" when the electric potential of the capacitor C1 becomes larger than a predetermined value "T" determined by a resistance R1 and a resistance R2. Here, the predetermined value "T" is given to correspond to the time that makes it possible to surely determine the failure state (for example, 1 second).

Figure 17:
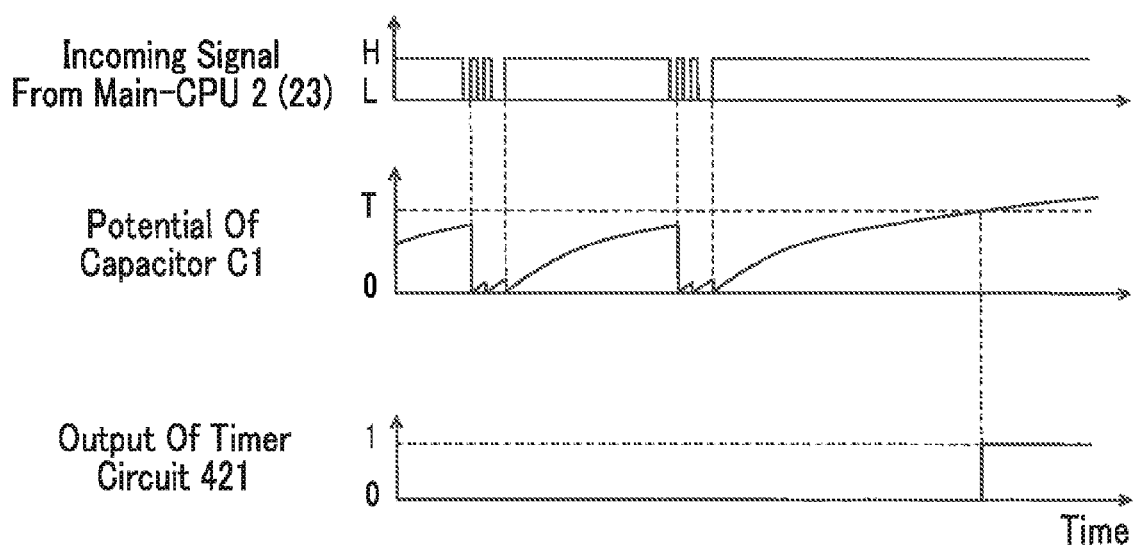
FIG. 17 is a waveform chart for illustrating an operation of the timer circuit shown in FIG. 16, according to Embodiment 6.

As shown in FIG. 17, although the potential of the capacitor C1 in the CR circuit 421a increases with a lapse of time, the potential decreases when the incoming signal is provided from the main-CPU 2, since a transistor Tr1 in the reset circuit 421b turns ON. However, when no incoming signal is provided from the main-CPU 2, the potential of the capacitor C1 continues increasing, to thereby go beyond the predetermined value "T", so that the output of the determination circuit 421c becomes "H". Thus, assuming that the outputs "H" and "L" of the determination circuit 421c are "1" and "0", respectively, it is possible to achieve the timer circuit 421 in which "0" is output to a line 33 when the incoming signal is provided from the main-CPU 2 in the period between a past time and a current time corresponding to the predetermined value "T", or "1" is output to the line 33 when the incoming signal is not provided.

As shown in FIG. 15, the signal received from the main-CPU 2 is stored and retained in the RAM 422. Meanwhile, the ROM 423 is a memory in which the data to be transmitted by the main-CPU 2 at the normal time is stored in advance. The comparator 424 serves to compare the RAM 422 and the ROM 423, and to output "0" in the case of matching, or output "1" in the case of difference. Accordingly, the output of the comparator 424 becomes "0" when the data transmitted from the main-CPU 2 is normal, whereas the output of the comparator 424 becomes "1" when the data transmitted from the main-CPU 2 is abnormal.

The error determination circuit 425 serves to take logical OR operation between the output of the timer circuit 421 and the output of the comparator 424, and to output the operation result. Further, the output retaining circuit 426 is configured with a SR flip-flop circuit that retains the previously output value as the output Q when an input signal entered into the input port S is "0", and sets the output Q to "1" when an input signal entered into the input port S is "1". Note that the output Q of the SR flip-flop is initialized to "0" at the system startup time. Accordingly, such a communication monitoring circuit 42 is realized that outputs "0" when the main-CPU 2 is transmitting normal data constantly, and that outputs "1" when the data transmitted by main-CPU 2 is abnormal or no data is transmitted by the main-CPU 2, followed by retaining such a state of outputting "1".

Figure 18:
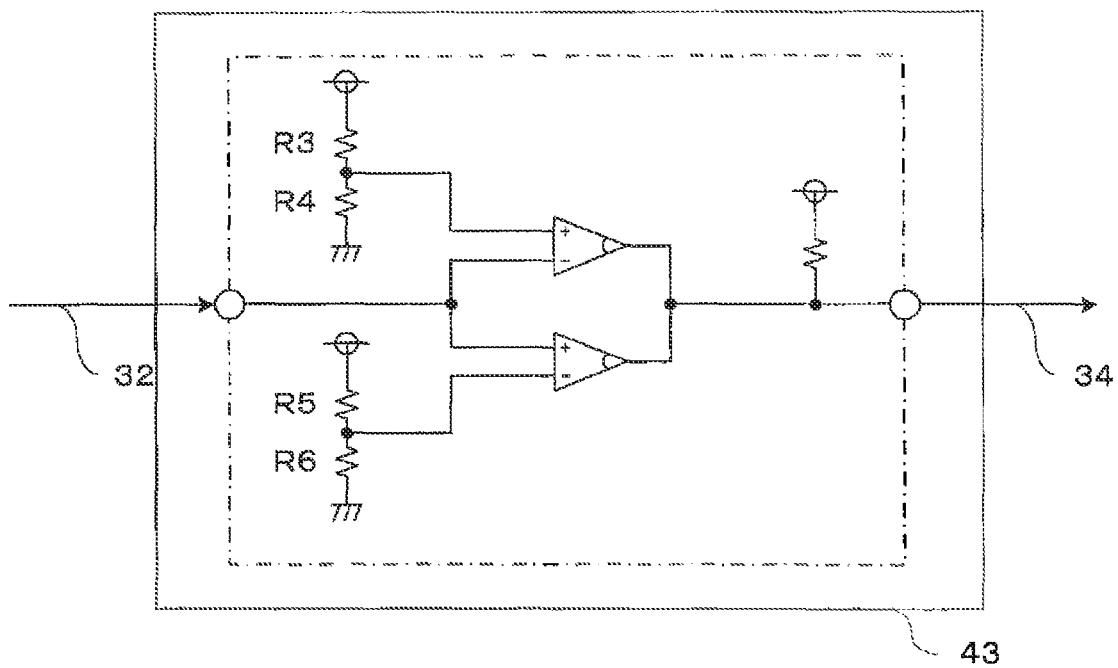
FIG. 18 is a block diagram showing a torque signal monitoring circuit according to Embodiment 6.

As shown in FIG. 18, the torque signal monitoring circuit 43 is configured with a window comparator. A voltage determined by a resistance R3 and a resistance R4 is represented by a predetermined value "TrqH", and a voltage determined by a resistance R5 and a resistance R6 is represented by a predetermined value "TrqL". Here, when the predetermined value "TrqH" is made higher, as converted value to a torque signal, than 0N·m (for example, 1N·m), and the predetermined value "TrqL" is made lower, as converted value to a torque signal, than 0N·m (for example, −1N·m), the output of the torque signal monitoring circuit 43 becomes "H" if the torque signal input through the line 32 is less than the predetermined value "TrqH" but larger than the predetermined value "TrqL". Meanwhile, the output of the torque signal monitoring circuit 43 becomes "L" if the torque signal is larger than the predetermined value "TrqH", or less than the predetermined value "TrqL".

Figure 19:
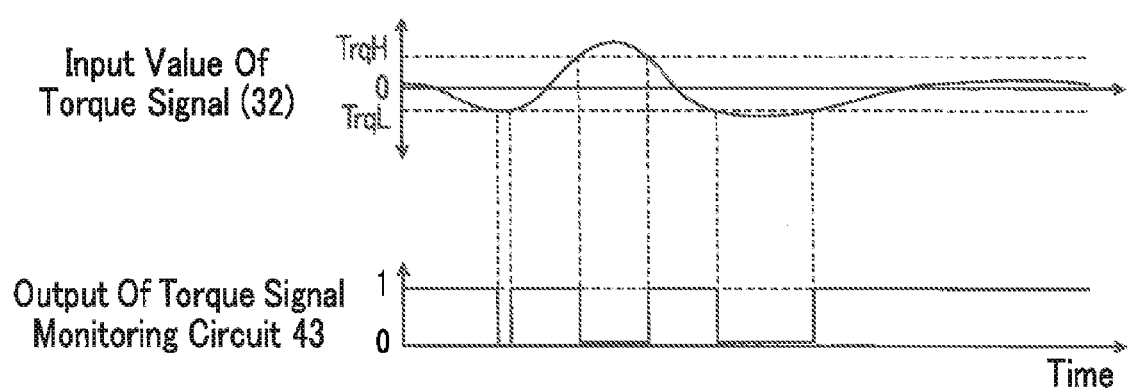
FIG. 19 is a waveform chart for illustrating an operation of the torque signal monitoring circuit shown in FIG. 18, according to Embodiment 6.

Thus, assuming that the outputs "H" and "L" of the circuit are "1" and "0", respectively, it is possible to achieve such a torque signal monitoring circuit 43 in which, as shown in FIG. 19, "1" is output to the line 34 when the torque signal is neutral (between the predetermined value "TrqH" and the predetermined value "TrqL"), and "0" is output to the line 34 when the torque signal is out of neutral.

Figure 20:
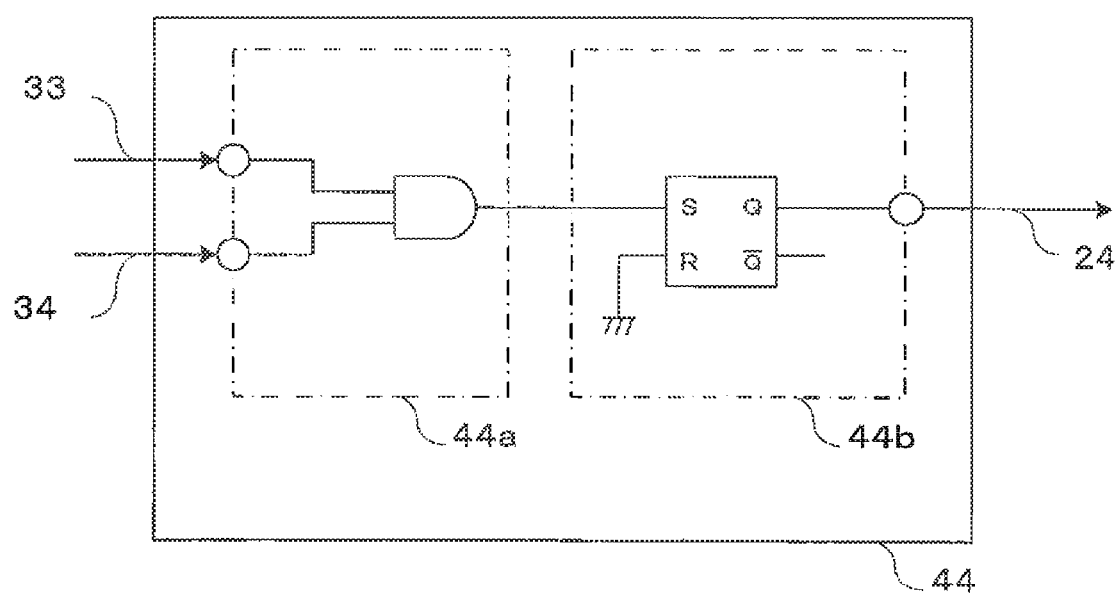
FIG. 20 is a block diagram showing a drive-circuit controlling circuit according to Embodiment 6.

As shown in FIG. 20, the drive-circuit controlling circuit 44 is configured with a logical AND circuit 44a and an output retaining circuit 44b. The signal input through the line 33 and the signal input through the line 34 are subjected to a logical AND operation by the logical AND circuit 44a, and then the operation result is output into the output retaining circuit 44b. The output retaining circuit 44b is configured with a SR flip-flop circuit that retains the previously output value as the output Q when an input signal entered into the input port S is "0", and sets the output Q to "1" when an input signal entered into the input port S is "1". Note that the output Q of the SR flip-flop is initialized to "0" at the system startup time. The output Q is output through the line 24 to the drive circuit 4.

With the foregoing configuration, it is possible to achieve the function equivalent to that by the sub-CPU 3 in Embodiment 1, in which, when the received data from the main-CPU 2 is abnormal or its receiving is interrupted, such a state is retained as the second control mode, and then sets the first mode, when the torque signal becomes neutral, to thereby suspend the drive circuit 4.

It should be noted that unlimited combination of the respective embodiments, and any modification and omission in the embodiments may be made appropriately in the present invention without departing from the scope of the invention.

The invention claimed is:

1. An electric power steering apparatus which comprises:
   a steering torque sensor that detects a steering torque applied to a steering wheel by a driver;
   a motor that provides power to a steering system to assist a steering force of the driver;
   a central processing unit (CPU) that outputs a drive signal for driving the motor, according to the steering torque detected by the steering torque sensor;
   a monitoring/controlling means that monitors a failure of the CPU and controls the drive signal for driving the motor at the time of the failure of the CPU; and
   an interlock circuit which is connected to the CPU,
   wherein the monitoring/controlling means has a first control mode for suspending driving of the motor, and a second control mode for continuously controlling the motor with a provisional drive signal, in place of and for restricting the drive signal from the CPU;
   wherein, when the monitoring/controlling means detects the failure of the CPU, the monitoring/controlling means selects the second control mode to thereby continue controlling the motor with the provisional drive signal in place of the drive signal from the CPU, and after the second control mode, the monitoring/controlling means switches to the first control mode to suspend driving of the motor,
   wherein the interlock circuit has a drive permitted region and a drive prohibited region with respect to a relationship between the steering torque and the drive signal output by the CPU, so that, when the steering torque and the drive signal fall within the drive permitted region, the interlock circuit transmits the drive signal in an unchanged form, and when the steering torque and the drive signal fall within the drive prohibited region, the interlock circuit adds a restriction on the drive signal so as to restrict the drive signal outside of the drive prohibited region, wherein, when the monitoring/controlling means selects the second control mode to continue controlling the motor with the provisional drive signal, the provisional drive signal is further restricted by the interlock circuit such that when the provisional drive signal is in the drive prohibited region, the provisional drive signal is adjusted to the drive permitted region, and wherein the CPU and the monitoring and controlling circuit continuously communicate with each other to determine whether respective operations of the other are normal.

2. The electric power steering apparatus of claim 1, wherein, when a time selecting the second control mode becomes longer than a predetermined time, the monitoring/controlling means selects the first control mode to thereby suspend driving of the motor.

3. The electric power steering apparatus of claim 1, wherein, when the provisional drive signal becomes lower than a predetermined value during selecting the second control mode, the monitoring/controlling means selects the first control mode to thereby suspend driving of the motor.

4. The electric power steering apparatus of claim 1, wherein the provisional drive signal serves to restrict the drive signal for the motor so as to suppress driving of the motor, when the drive signal for the motor output from the CPU acts to drive the motor in a direction opposite to a direction of the steering torque applied to the steering wheel.

5. The electric power steering apparatus of claim 1, wherein the provisional drive signal serves to add a restriction on the drive signal for the motor output from the CPU so as to lower the drive signal.

6. The electric power steering apparatus of claim 5, wherein a drive signal restriction circuit is connected to the CPU, and the drive signal restriction circuit is configured to restrict the drive signal for the motor output from the CPU, by using a signal at the time the monitoring/controlling means selects the second control mode, to thereby obtain the provisional drive signal.

7. The electric power steering apparatus of claim 6, wherein the drive signal restriction circuit gradually lowers with a lapse of time, the drive signal for the motor output from the CPU, by using a signal at the time the monitoring/controlling means selects the second control mode, to thereby obtain the provisional drive signal.

8. The electric power steering apparatus of claim 6, wherein the drive signal restriction circuit gradually lowers the drive signal for the motor output from the CPU, according to change in a vehicle-speed signal of a vehicle speed sensor, by using a signal at the time the monitoring/controlling means selects the second control mode, to thereby obtain the provisional drive signal.

9. The electric power steering apparatus of claim 6, wherein the drive signal restriction circuit gradually lowers the drive signal for the motor output from the CPU, according to change in the steering torque, by using a signal at the time the monitoring/controlling means selects the second control mode, to thereby obtain the provisional drive signal.

10. The electric power steering apparatus of claim 1, wherein, together with the CPU that outputs the drive signal for driving the motor according to the steering torque detected by the steering torque sensor, a drive signal generating circuit is provided that outputs another drive signal for driving the motor according to the steering torque, and wherein the monitoring/controlling means, when detects the failure of the CPU, selects said another drive signal output by the drive signal generating circuit, as the drive signal to be applied to drive the motor, by using a signal at the time the monitoring/controlling means selects the second control mode, to thereby use said another drive signal as the provisional drive signal.

11. The electric power steering apparatus of claim 1, wherein the drive circuit measures a current flowing through the motor, and transmits the measured current as an actual drive current to the CPU and the interlock circuit via a feedback line.

12. The electric power steering apparatus of claim 11, wherein the CPU compares the actual drive current with the steering torque signal to determine the drive signal.

13. The electric power steering apparatus of claim 11, wherein the interlock circuit further restricts the drive signal based on the motor current signal.

14. The electric power steering apparatus of claim 1, wherein the monitoring and control circuit controls the drive circuit via a line to accept transmission of the provisional drive signal output from the interlock circuit instead of the drive signal from the CPU.

15. The electric power steering apparatus of claim 1, further comprising a drive signal restriction circuit connected to the CPU and the interlock circuit and is configured to output the provisional drive signal which is obtained from restricting the drive signal for the motor output by the CPU based on a signal of the control and monitoring circuit when the failure of the CPU is detected and wherein the drive signal restriction circuits does not add an additional restriction when the control and monitoring circuit has not yet detected the failure of the CPU; and wherein, when the control and monitoring circuit detects the failure of the CPU and selects the second control mode, the drive signal restriction circuit adds restrictions with a lapse of time.

16. The electric power steering apparatus of claim 15, wherein the drive signal restriction circuit calculates a logical product using an AND circuit of the drive signal by the CPU and the drive restriction signal input through a line from the control and monitoring circuit at a time the second control mode is selected and outputs the logical product to the interlock circuit.

17. The electric power steering apparatus of claim 1, further comprising a drive signal restriction circuit and wherein the interlock circuit is connected to the CPU and the control and monitoring circuit, via the drive signal restriction circuit.

18. An electric power steering apparatus which comprises:
a steering torque sensor configured to detect a steering torque applied to a steering wheel by a driver;
a motor configured to provide power to a steering system to assist with the steering of the steering wheel;
a central processing unit (CPU) configured to output a drive signal for driving the motor, according to the steering torque detected by the steering torque sensor;
an auxiliary processing unit configured to monitor the CPU for a failure and configured to control the drive signal if the failure of the CPU is detected such that the auxiliary processing unit first switches to a second mode in which the motor is controlled with a provisional drive signal from the auxiliary processing unit instead of the driving signal from the CPU; and
an interlock circuit configured to limit the drive signal and the provisional drive signal based on preset regions that are preset based on the steering torque and the respective signal, wherein the CPU and the monitoring and controlling circuit continuously communicate with each other to determine whether respective operations of the other are normal.

19. The electric power steering apparatus of claim 18, wherein the auxiliary processing unit has a first control mode for suspending driving of the motor, and a second control mode for continuously controlling the motor with the provisional drive signal, in place of the drive signal from the CPU, and wherein, when the auxiliary processing unit detects the failure of the CPU, the auxiliary processing unit selects the second control mode to continue controlling the motor with the provisional drive signal, and after the second control mode, the auxiliary processing unit switches to the first control mode to suspend the driving of the motor.

20. The electric power steering apparatus of claim 19, wherein the interlock circuit has a drive permitted region and a drive prohibited region with respect to a relationship between the steering torque and one of: the drive signal output by the CPU and the provisional drive signal output by the auxiliary processing unit, so that, when the steering torque and the respective drive signal fall within the drive permitted region, the interlock circuit transmits the drive signal in an unchanged form, and when the steering torque and the drive signal fall within the drive prohibited region, the interlock circuit adds a restriction on the drive signal so as to restrict the drive signal outside of the drive prohibited region.

21. The electric power steering apparatus of claim 20, wherein the auxiliary processing unit compares data from the CPU with pre-stored data to determine the failure of the CPU such that a mismatch indicates the failure of the CPU.

22. The electric power steering apparatus of claim 18, wherein the auxiliary processing unit detects the failure of the CPU, a switching means is configured to switch to providing the motor with the generated provisional drive signal instead of the drive signal.

23. The electric power steering apparatus of claim 18, wherein the auxiliary processing unit comprises a timer, a capacitor, a comparator, and an error determination circuit.

* * * * *